US011165827B2

(12) United States Patent
Bender et al.

(10) Patent No.: US 11,165,827 B2
(45) Date of Patent: Nov. 2, 2021

(54) SUSPENDING COMMUNICATION TO/FROM NON-COMPLIANT SERVERS THROUGH A FIREWALL

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Todd R. Palmer, Danbury, CT (US); Helio L. Pinheiro E Mota, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 16/175,041

(22) Filed: Oct. 30, 2018

(65) Prior Publication Data
US 2020/0137114 A1    Apr. 30, 2020

(51) Int. Cl.
*H04L 29/06*    (2006.01)

(52) U.S. Cl.
CPC ............ *H04L 63/20* (2013.01); *H04L 63/029* (2013.01); *H04L 63/0263* (2013.01)

(58) Field of Classification Search
CPC ...................................................... G06F 21/55
See application file for complete search history.

(56) References Cited

U.S. PATENT DOCUMENTS

| 7,346,922 | B2 | 3/2008 | Miliefsky |
| 7,996,713 | B2 | 8/2011 | Hanna |
| 9,065,804 | B2 | 6/2015 | Sweet et al. |
| 9,531,728 | B1 * | 12/2016 | Bennett ................. G06F 21/554 |
| 9,544,327 | B1 * | 1/2017 | Sharma ............... G06F 21/6245 |
| 9,591,016 | B1 * | 3/2017 | Palmieri ............. H04L 63/1433 |
| 9,769,208 | B2 * | 9/2017 | Chari ...................... G06F 21/62 |
| 9,906,513 | B2 | 2/2018 | Wuehler |

(Continued)

OTHER PUBLICATIONS

Anonymous, "Automating Server Firewalls—With CloudPassage Halo", Cloud Passage, 18 pgs.

(Continued)

*Primary Examiner* — Dao Q Ho

(74) *Attorney, Agent, or Firm* — William Hartwell; Matthew M. Hulihan; Heslin Rothenberg Farley & Mesiti PC

(57) ABSTRACT

Suspending communication to/from non-compliant servers through a firewall includes establishing a secure collection of compliance rules for security compliance, ascertaining, for each server of server(s) of an environment, respective software package(s) installed on the server, building a secure server and acceptable risk listing that indicates each of the server(s) and the software package(s) installed on each server, assigning and securely storing risk ratings for the server(s), comparing the assigned risk rating for a second server to an acceptable risk level indicated for a first server, and based on determining that the assigned risk rating for the second server exceeds the acceptable risk level, performing a rules modification to the firewall to enforce the compliance rules. The rules modification disables communication between the first server and the second server through the firewall.

20 Claims, 6 Drawing Sheets

(56) References Cited

U.S. PATENT DOCUMENTS

| | | | |
|---|---|---|---|
| 9,992,025 B2* | 6/2018 | Mahaffey | G06F 8/60 |
| 10,382,340 B1* | 8/2019 | Das | H04L 43/028 |
| 10,402,577 B2* | 9/2019 | Knapp | H04L 63/145 |
| 10,642,870 B2* | 5/2020 | Malhotra | H04L 63/101 |
| 2005/0273850 A1 | 12/2005 | Freund | |
| 2006/0085850 A1 | 4/2006 | Mayfield et al. | |
| 2006/0101516 A1* | 5/2006 | Sudaharan | H04L 63/10 726/23 |
| 2015/0058619 A1* | 2/2015 | Sweet | H04L 9/3247 713/155 |
| 2015/0278729 A1* | 10/2015 | Hu | G06Q 10/0635 705/7.28 |
| 2016/0099963 A1* | 4/2016 | Mahaffey | H04L 63/0227 726/25 |
| 2016/0306970 A1* | 10/2016 | Bell, Jr. | G06F 21/564 |
| 2017/0031676 A1 | 2/2017 | Checchetti | |
| 2017/0041296 A1* | 2/2017 | Ford | H04L 63/0421 |
| 2017/0177879 A1* | 6/2017 | Sharma | G06F 21/577 |
| 2017/0251013 A1* | 8/2017 | Kirti | H04L 63/1441 |
| 2018/0089436 A1 | 3/2018 | Smith et al. | |
| 2018/0129806 A1 | 5/2018 | Bender et al. | |
| 2018/0218456 A1* | 8/2018 | Kolb | G06Q 30/08 |
| 2018/0293389 A1* | 10/2018 | Mahaffey | H04L 63/1408 |
| 2019/0034657 A1* | 1/2019 | Ford | H04L 63/1433 |
| 2019/0109713 A1* | 4/2019 | Clark | H04L 9/3239 |
| 2019/0132350 A1* | 5/2019 | Smith | H04L 41/22 |
| 2019/0327259 A1* | 10/2019 | DeFelice | G06N 3/0472 |
| 2019/0379699 A1* | 12/2019 | Katragadda | G06N 3/006 |
| 2020/0099512 A1* | 3/2020 | Kikinis | H04L 9/0637 |
| 2020/0153793 A1* | 5/2020 | Kikinis | H04L 63/126 |
| 2020/0250549 A1* | 8/2020 | Kikinis | H04L 9/3239 |
| 2020/0311790 A1* | 10/2020 | Keren | G06F 40/20 |

OTHER PUBLICATIONS

Kaaniche, N., et al., "A Blockchain-based Data Usage Auditing Architecture with Enhanced Privacy and Availability", 16th International Symposium on Network Computing and Applications (NCA), 2017 IEEE, Oct. 30-Nov. 1, 2017, 5 pgs.

Mell, Peter, et al., "The NIST Definition of Cloud Computing", NIST Special Publication 800-145, Sep. 2011, Gaithersburg, MD, 7 pgs.

* cited by examiner

SUSPENDING COMMUNICATION TO/FROM NON-COMPLIANT SERVERS THROUGH A FIREWALL

BACKGROUND

Corporations and other entities commonly establish compliance requirements to which servers must abide. These requirements can relate to any points of compliance, for instance middleware versioning, password rules, data encryption, and other rules. If an entity server or an outside server in communication with the entity server(s) is not compliant, risk may be introduced into the entity's computing environment.

SUMMARY

Shortcomings of the prior art are overcome and additional advantages are provided through the provision of a computer-implemented method. The method establishes a secure collection of compliance rules for security compliance. The establishing can include accessing electronic security risk information identifying and describing security risks of software packages. The establishing further includes assigning a respective risk level to each of the identified security risks. Further, the establishing includes building and storing the secure collection of compliance rules. At least some of the compliance rules indicate the software packages and assigned risk levels of the identified security risks. The method also ascertains, for each server of server(s) of an environment, respective software package(s) installed on the server. The method builds a secure server and acceptable risk listing. The secure server and acceptable risk listing indicates each of the server(s) of the environment and the respective software package(s) installed on each such server. The method assigns, based on a comparison of the compliance rules against the secure server and acceptable risk listing, risk ratings for the server(s), and securely stores the assigned risk ratings. The method compares, for a first server in communication with a second server, the second server being a server of the server(s), the assigned risk rating for the second server to an acceptable risk level indicated for the first server. The acceptable risk level is a level of risk the first server is configured to accept in communicating with the second server through a firewall. Based on determining that the assigned risk rating for the second server exceeds the acceptable risk level, the method performs a rules modification to the firewall to enforce the compliance rules. The rules modification disables communication between the first server and the second server through the firewall.

Further, a computer system is provided that includes a memory and a processor in communication with the memory, wherein the computer system is configured to perform a method. The method establishes a secure collection of compliance rules for security compliance. The establishing can include accessing electronic security risk information identifying and describing security risks of software packages. The establishing further includes assigning a respective risk level to each of the identified security risks. Further, the establishing includes building and storing the secure collection of compliance rules. At least some of the compliance rules indicate the software packages and assigned risk levels of the identified security risks. The method also ascertains, for each server of server(s) of an environment, respective software package(s) installed on the server. The method builds a secure server and acceptable risk listing. The secure server and acceptable risk listing indicates each of the server(s) of the environment and the respective software package(s) installed on each such server. The method assigns, based on a comparison of the compliance rules against the secure server and acceptable risk listing, risk ratings for the server(s), and securely stores the assigned risk ratings. The method compares, for a first server in communication with a second server, the second server being a server of the server(s), the assigned risk rating for the second server to an acceptable risk level indicated for the first server. The acceptable risk level is a level of risk the first server is configured to accept in communicating with the second server through a firewall. Based on determining that the assigned risk rating for the second server exceeds the acceptable risk level, the method performs a rules modification to the firewall to enforce the compliance rules. The rules modification disables communication between the first server and the second server through the firewall.

Yet further, a computer program product including a computer readable storage medium readable by a processing circuit and storing instructions for execution by the processing circuit is provided for performing a method. The method establishes a secure collection of compliance rules for security compliance. The establishing can include accessing electronic security risk information identifying and describing security risks of software packages. The establishing further includes assigning a respective risk level to each of the identified security risks. Further, the establishing includes building and storing the secure collection of compliance rules. At least some of the compliance rules indicate the software packages and assigned risk levels of the identified security risks. The method also ascertains, for each server of server(s) of an environment, respective software package(s) installed on the server. The method builds a secure server and acceptable risk listing. The secure server and acceptable risk listing indicates each of the server(s) of the environment and the respective software package(s) installed on each such server. The method assigns, based on a comparison of the compliance rules against the secure server and acceptable risk listing, risk ratings for the server(s), and securely stores the assigned risk ratings. The method compares, for a first server in communication with a second server, the second server being a server of the server(s), the assigned risk rating for the second server to an acceptable risk level indicated for the first server. The acceptable risk level is a level of risk the first server is configured to accept in communicating with the second server through a firewall. Based on determining that the assigned risk rating for the second server exceeds the acceptable risk level, the method performs a rules modification to the firewall to enforce the compliance rules. The rules modification disables communication between the first server and the second server through the firewall.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
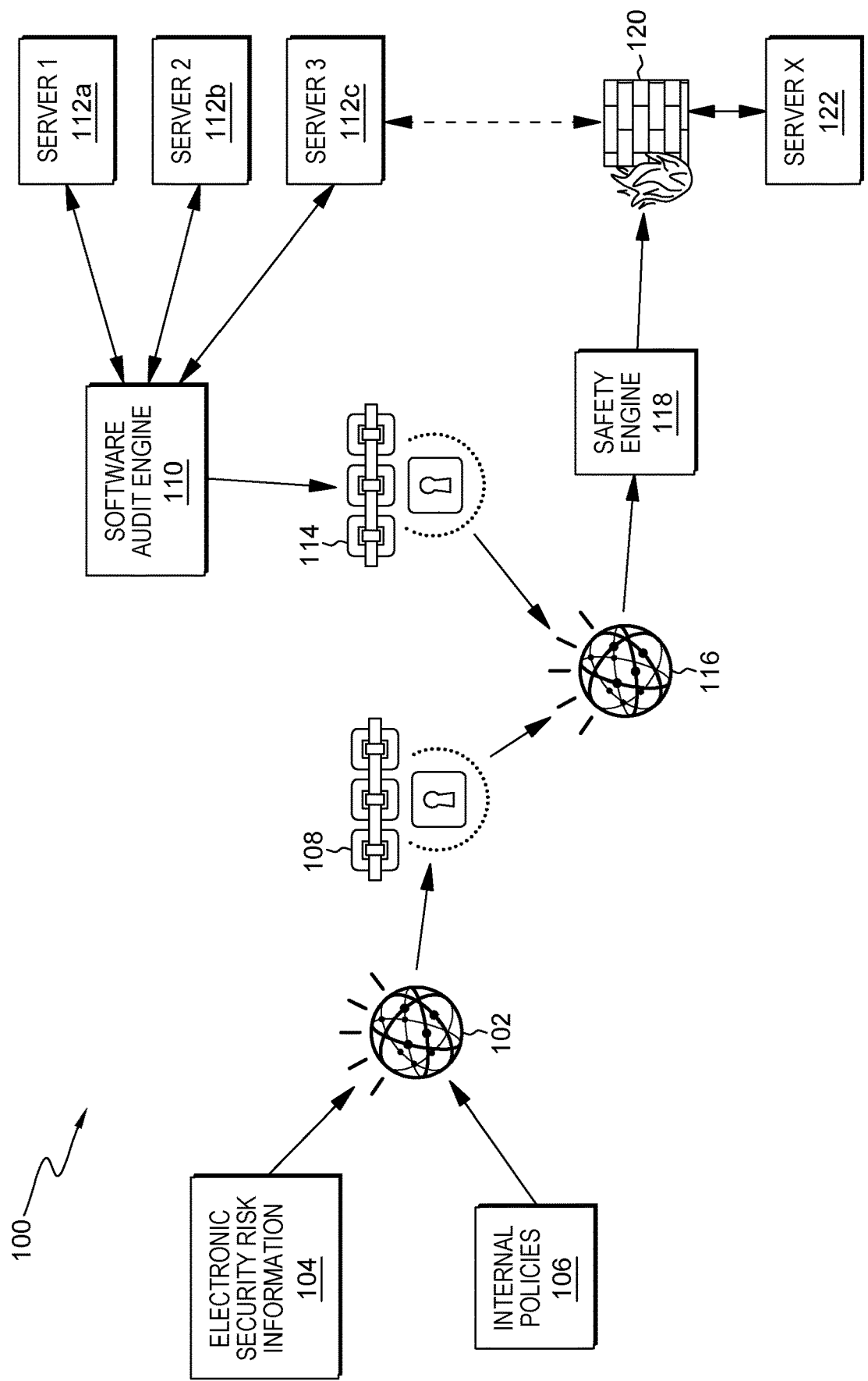
FIG. 1 depicts an example conceptual diagram of an environment for suspending communication to/from non-compliant servers through a firewall, in accordance with aspects described herein.

Described herein are approaches to minimize risk to an entity's computer systems (e.g. servers) by identifying systems that are increasing risk to the entity's infrastructure and suspending firewall rules that enable communication with those systems. Firewall rules may also be referred to as filters or policies implemented by the firewall. Generally, rules/filters selectively apply to certain network traffic that flows through given port(s) and/or that is attributed to given service(s). The rules allow or drop data packets flowing through the firewall. According to aspects described herein, a set of risk factors is generated for determining whether a server is compromised. The server may be an entity asset (e.g. a server of the IT/computing infrastructure of the entity) or an outside server. Server(s) hosting software that is considered a security risk, as identified based on, e.g., cognitive analysis of sources that are weighed by the strength of the information and the risk, are quarantined by closing firewall connections to/from the server that otherwise allow communication of potentially risky traffic, for instance traffic being exchanged in furtherance of the activities of that compromised software or, more broadly, any traffic flowing to/from a compromised machine. As examples, entity-controlled firewall(s) may be reconfigured to block communication between compromised server(s) and other servers. The compromised server(s) may or may not be entity-owned or controlled. If an outside server is poses the security risk, reconfiguration of the entity firewall can configure the firewall to block/drop communication coming from that compromised server into the entity's network. If an entity server poses the security risk, the firewall reconfiguration can block/drop communication being sent by that compromised entity server to other servers either internal or external to the entity network. In this manner, firewall rules that enable communication to occur to/from any server that has been deemed as non-compliant may be suspended.

A cognitive engine described herein can ingest electronic security risk information/data from product vendors, weblogs, and other relevant sources conveying risks related to software packages and versions thereof. The cognitive engine can build and output compliance rules. The rules can be securely stored and maintained in a database/data structures, such as a blockchain (termed herein a 'generated rules and risk level' blockchain). A software audit engine can audit a collection of servers, which may include entity servers and optionally outside servers, to ascertain software installed thereon. In some aspects, the results are also maintained in a secure/trusted source structure, such as another blockchain (termed herein a 'secure server and acceptable risk' blockchain), to properly list all software packages that are installed on any audited server. This secure server and acceptable risk blockchain may be modified by the software audit engine as software packages installed on the audited servers change or become updated.

A governance engine can check risks identified by the cognitive engine and loaded into the rules compliance rules database, i.e. generated rules and risk level blockchain, against the trusted source structure (secure server and acceptable risk blockchain) having the information about the audited servers. The checking identifies servers that are out of compliance. The governance engine can modify the trusted source structure (secure server and acceptable risk blockchain) to mark non-compliant servers as such.

When the secure server and acceptable risk blockchain is marked to indicate a non-compliant server, this can trigger a safety engine to suspend access to the server by modifying one or more firewall rules/policies/filters, for instance to add rule(s) to filter/drop data packets to or from the server, remove rule(s) that open ports or service traffic to/from the server, or suspend rule(s) that open ports or service traffic to/from the server. In some embodiments, suspending means the rule is deactivated but maintained for possible re-enablement at a later time.

FIG. 1 depicts an example conceptual diagram of an environment 100 for suspending communication to/from non-compliant servers through a firewall, in accordance with aspects described herein. Cognitive engine 102 accesses and ingests electronic security risk information 104, such as information from security-related weblogs ("blogs") and product vendor information about security risks. It also ingests internal policies 106, which may be enterprise standards for the environment set by an enterprise/entity in control of servers in the environment. The cognitive engine 102 generates rules for non-complying software levels and associated risk, and stores this in a secure database, e.g. the generated rules and risk level blockchain 108. Thus, the engine 102 establishes a secure collection of compliance rules, as the blockchain 108, for security compliance. It accesses the electronic security risk information 104 and policies 106 identifying and describing security risks of software packages, assigns a respective risk level to each of the identified security risks, and builds and stores the secure collection of compliance rules as the blockchain 108. At least some of these compliance rules indicate the software packages and assigned risk levels of the identified security risks. In addition, some compliance rules can include enterprise standards, for instance indicating an enterprise requirement for a strong password, as one example.

By way of specific example, the cognitive engine 108 could identify based on information 104 in a security blog that a bug was discovered in a particular version of a software package, the bug exposing a significant security risk. If the particular software/version is not already noted in the blockchain 108, it can be added and the bug/risk identified therein. Any other information associated with the bug/risk could also be included. The blockchain can indicate rules, related that that risk, to be implemented on affected servers, for instance rules that mitigate, remove, or otherwise address the risk.

The compliance rules are used in further analysis, particularly in the application of the rules to the current configurations of servers of the environment. For a collection of servers (112a, 112b, 112c in the example of FIG. 1), software audit engine 110 ascertains, for each of the servers, respective software package(s) installed on the server. The audit engine 110 builds a secure server and acceptable risk listing, e.g. blockchain 114, which indicates each of the audited servers and the respective software package(s) installed on each server. Each blockchain 108 and 114 can be a distributed blockchain to promote security and verifiability of the information contained therein.

With the compliance rules 108 indicating risks associated with known software packages, and the secure server an acceptable risk listing 114 indicating which software packages are installed on the audited servers 112a, 112b and 112c, another cognitive engine, e.g. governance engine 116, compares the compliance rules 108 against the secure server an acceptable risk listing 114, and assigns, based on this comparison, risk ratings for the servers 112a, 112b, 112c. The risk ratings can be of any desired granularity—each server could have an overall risk rating for the server and/or more granular risk ratings, for instance a respective risk rating for each of the server's installed software packages. So, as one example, a server could receive a 'compliant' risk rating for software A, a 'non-compliant' risk rating for software B, and an overall rating of 'non-compliant'. Additionally, an assigned risk rating of a server can be further based on whether the server is in compliance with the enterprise standards for the environment.

The risk rating(s) for each of the servers can be securely stored, for instance in the blockchain 114 and associated with each server's respective entry in that blockchain.

By comparing the risks (identified by 108) with the inventory of audited servers that are reviewed (indicated by 114), the risks in interacting with servers 112a, 112b, 112c is determined. This can be used in conjunction with another server's level of risk that it is willing to accept in interacting with the servers. For instance, server X 122 in FIG. 1 is another server, and in this example is a remote server that is not part of the entity's network. Sever 122 communicates with server 112c through firewall 120. Server 122 has indicated level(s) of risk that it is willing to accept in interacting with other servers, for instance server 112c in the example of FIG. 1.

Governance engine 116 can compare, for server 122 in communication with server 112c, the assigned risk rating for server 112c (as indicated by blockchain 114) to an acceptable risk level indicated for server 122. The acceptable risk level of server 122 is a level of risk that server 122 is configured to accept insofar as communications with server 112c through firewall 120.

If the risk posed by server 112c is higher than the level server 122 is willing to accept, then the configuration of the firewall 120 can be changed to disable communication between the two servers.

Additionally or alternatively, if an audited server (112a, 112b, 112c) receives a risk rating that exceeds a preset threshold, a policy can be enforced that disables communication to/from that server regardless of what level of risk other servers are willing to accept. This can be done for servers that present a particularly significant risk to other entity assets.

Since different servers might have different levels of risk they are willing to tolerate, it is possible that communication with one server may be disabled via firewall modification while communication with another server may be permitted. Each server can have its own acceptable level of risk, which could be a function of any desired factors, for instance what data is being exchanged with the particular server, the sensitivity level of that data, and how that data is being used by the server.

It is noted that server 122 is an external server in this example but the aspects described herein could apply to control communication between two or more of the audited servers of the enterprise. For instance, servers 112a, 112b and 112c could also have acceptable risk levels associated therewith and stored in blockchain 114. If server 112c is sufficiently risky, communication between it and server 112a (as an example) could be disabled based on server 112a's level of risk it is willing to accept.

As another example, external server 122 may be included in the set of audited servers, meaning a risk rating could be assigned to server 122. Based on determining its risk rating, communication between server 122 and an internal server (e.g. server 112c) can be disabled via reconfiguration of firewall 120. Thus, for any pair of servers, either both internal or one internal and one external, communication therebetween could be disabled based on comparing either server's acceptable risk level against the other server's risk rating. Since the enterprise has control over firewall 120, communication both to and from the enterprise network assets can be controlled, regardless of whether it is an enterprise server that poses the risk or an outside server.

The comparison by the governance engine 116 is used to modify firewall settings to keep a secure environment. Safety engine 118 may be the component that suspends rules (ports/services) in the firewall based on the comparison performed by governance engine 116. Thus, based on determining that the acceptable risk level of a first server is exceeded by an assigned risk rating for a second server, the safety engine 118 can perform a rules modification to firewall 120 to enforce the compliance rules by disabling communication with the non-compliant server. The rules modification can disable communication between the first server and the second server through the firewall. The rules modification can include adding, removing, modifying, or suspending at least one rule, filter, policy, or the like of the firewall. In a particular example, the rules modification includes indefinitely suspending one or more firewall rules of the firewall. Then, if the software contributing to the risk rating of the second server is patched or the threat is otherwise removed, and the risk of that server decreases to an acceptable level, the suspended firewall rule(s) could be reinstated based on that change.

The rules modification is to disable communication between the first server and the second sever that is associated with, e.g., a software package, installed on the second server, for which an identified security risk is identified. In some examples, if the servers are communicating via other ports or services, it is possible that this other communication not associated with the software package remains enabled.

Blockchains 108 and 114 can be updated over time as more risks are identified and software packages are installed, removed or updated. The comparisons by the governance engine can repeat as an ongoing process to reconfigure the firewall when desired.

Accordingly, systems and methods are provided for governance to suspend firewall rules directed to communication involving server(s) deemed as non-compliant. Aspects of an example system can include a cognitive engine that ingests data from, e.g., product vendors and blogs about software versions that increase the risk that a server could be compromised. The level of risk can be quantified by, e.g., the sources and volumes (frequency) of the reports. For instance, a report from a product vendor (weighted relatively heavily because it is a trusted source) indicating that there is a problem with the software product that needs to be patched, even if it is the only report about the risk, may result in the risk being assigned a high risk level. A single blog entry by a third party may result in the risk being assigned a low risk level. Thus, the cognitive engine may leverage:
 (i) a data acquisition process capable of fetching resources using any desired method(s) from any desired sources identified, e.g., by universal resource identifiers;

(ii) a data storage medium capable of storing data fetched from the sources;

(iii) a data training process capable of reading data from the storage medium, extracting relevant natural language features, and reading a feature map (e.g. statically user-defined) and a categorical set of document classes, and generating a machine classifier model;

(iv) an automated data classification process capable of consuming the trained model and using extracted natural language features from documents (blog entries, etc.) to assign a risk score to the document. In this regard, assigning a risk level to an identified security risk can include applying a trained classifier model to extracted natural language features from the accessed electronic security risk information, the applying classifying the identified security risk and assigning the risk level based on the classification; and (v) a data access layer allowing other entities (such as a governance engine) to access scores for the risks harvested by the cognitive engine from the information sources.

An example compliance rule might state that '[specific OS] version 7.8 includes a bug #671983 in it that is low risk'. Another example rule might state that '[Vendor]-identified exploit #2211 is high risk due to high potential for exploit'.

The governance engine checks risks identified by the cognitive engine and loaded into the rules database 108 against server information indicating software packages and other relevant information about the servers. A risk correlation process matches risks identified by the cognitive engine with enterprise server assets, and risk ratings are assigned for the severs. A risk tolerance matrix can define acceptable risk levels for individual servers, for instance other enterprise servers, assets, or groups thereof. An event publishing component can notify all interested and authorized parties/servers/entities of the adjudicated compliance status (risk rating) of a server asset.

The governance engine runs against a trusted source for information about every audited server being tracked, and as indicated this trusted source could be a blockchain in which information about accessing each server in the enterprise could also be stored. From this, it can be identified which communications are to be disabled based on the risk levels posed as compared to the levels of risk servers are willing to accept. For instance, the governance engine could check for each server, and, based on its stated threshold of acceptable risk, identify firewall ports for any other server connection to non-compliant servers (i.e. those deemed too risky based on the acceptable level of risk). The governance engine could run on a predetermined schedule. In some aspects, the governance engine could allow for an approved exception override that would allow communication with a risky server to be continued.

A software audit engine can run against every audited server, modifying the blockchain (e.g. 114 of FIG. 1) to properly list all software packages that were installed on each such server. The governance engine can use this to check software versions when comparing to the compliance rules. In some examples, a collector agent runs on each server being audited and introspects the resource to collect relevant information, then publishes the information to the blockchain (114 of FIG. 1).

When the governance engine modifies the blockchain to mark a server as non-compliant, this can trigger safety engine to modify rule(s) on the firewall, for instance suspend (e.g. disable but maintain as inactive) firewall port/service openings to other server(s) so that no other server is at risk. When the governance engine marks a server as compliant in the future, the ports can be re-enabled by reinstating the suspended openings. Thus, some aspects present process(es) for (i) receiving notification from the governance engine about when compliance status for a server changes, (ii) performing an action based on the notification, (iii) planning a set of changes to firewall resources attached to server resources associated with the notification received from the governance engine, and (iv) pushing a planned set of changes to one or more firewall devices to disable relevant communication.

In accordance with aspects described herein, computer systems/methods for improving computer security can ingest known problems of specific software revisions, packages, or the like, ingest corporate policies regarding security, create a rules database for audit compliance, identify servers to be audited, analyze these servers against the generated rules, determine the level of risk for each server analyzed, compare the risk generated to a secure database of servers connecting to the analyzed servers, and close firewall ports through which communication occurs to/from servers determined to be compromised.

Natural language processing can be leveraged to capture and identify risk from outside sources (i.e. electronic security risk information). Risk rating of a risk can be dictated at least in part based on source and/or frequency of reportings of the identified risk. Risk rating can also be a function of a severity or potential severity of the problem presented by the risk. Risk ratings can be stored in a secure database. Risk weightings can be put on each risk that might affect a server. The risk rating for a server can be increased when multiple risks are identified on that server. In addition, natural language processing can also be used to capture server risk based on internal/enterprise rules. The risk factors for both this internal and the external data can be combined to a secure rules database.

Servers listed in a secure database can be audited against the rules in the secure rules database. A comparison of the risk rating for one server can be made against the configured acceptable level of risk that another server has determined is acceptable. For servers with acceptable risk level lower than the risk rating of a server, openings in firewall(s) between those servers and the risky server can be identified and suspended, and/or deleted. Additionally or alternatively, a rule, filter, or policy can be implemented on the firewall(s) that block communication between the servers and the risky server.

The following present some uses cases of aspects described herein:

An enterprise (company) application is supported by a server with a password that is set to not expire. The company has a policy that requires passwords to expire (and be reset) every 30 days. The non-expiration of the password on the application server constitutes a violation of company standards, and therefore the server is to be quarantined. That is, firewall rules enabling communication to/from that server from other server(s) are suspended, either outright or only for the servers with an acceptable risk level that is below the risk rating posed by the violation.

An enterprise (company) application is supported by a server with a password that is set to not expire, and the company has a policy that requires passwords to expire (and be reset) every 30 days. The application is given a 1-year exception to address this non-compliance before the server is quarantined.

An application is running a version of software that is at high risk for exploitation. The server is quarantined to disable communication between the server hosting that application and server(s) in communication with that application server.

A software vendor announces a patch for its software because of a security exposure. That particular software version is immediately put on a quarantine list in the form of a compliance rule that identifies the risk and assigning it a high risk rating. Traffic on the ports used by that software or a related service is blocked.

Security blogs note a risk exposure applicable to a piece of software. The risk is rated low based on the source (blogs) and relatively low number of reports of the risk. Applications (running on other servers) can choose (as indicated through their acceptable risk levels) to continue or terminate communications with servers having that software installed thereon. In this regard, there may be a signaling component by the applications or the servers running the applications that signal the level of risk they are willing to accept. In some examples, acceptable levels of risk for servers are included in the server and acceptable risk blockchain. Thus, for a given set of servers, the server and acceptable risk blockchain can list the servers, their installed software, and their acceptable risk levels.

Accordingly, described herein are systems to disable firewall rules to non-compliant servers, to use a trusted source (e.g. blockchains) to manage computer networking governance based on rules provided by an enterprise and harvested from sources of electronic security risk information, and to modify access to server(s) based on their indicated acceptable levels of risk. Software offerings supporting cloud and networking security could avail themselves of aspects described herein.

Figure 2A:
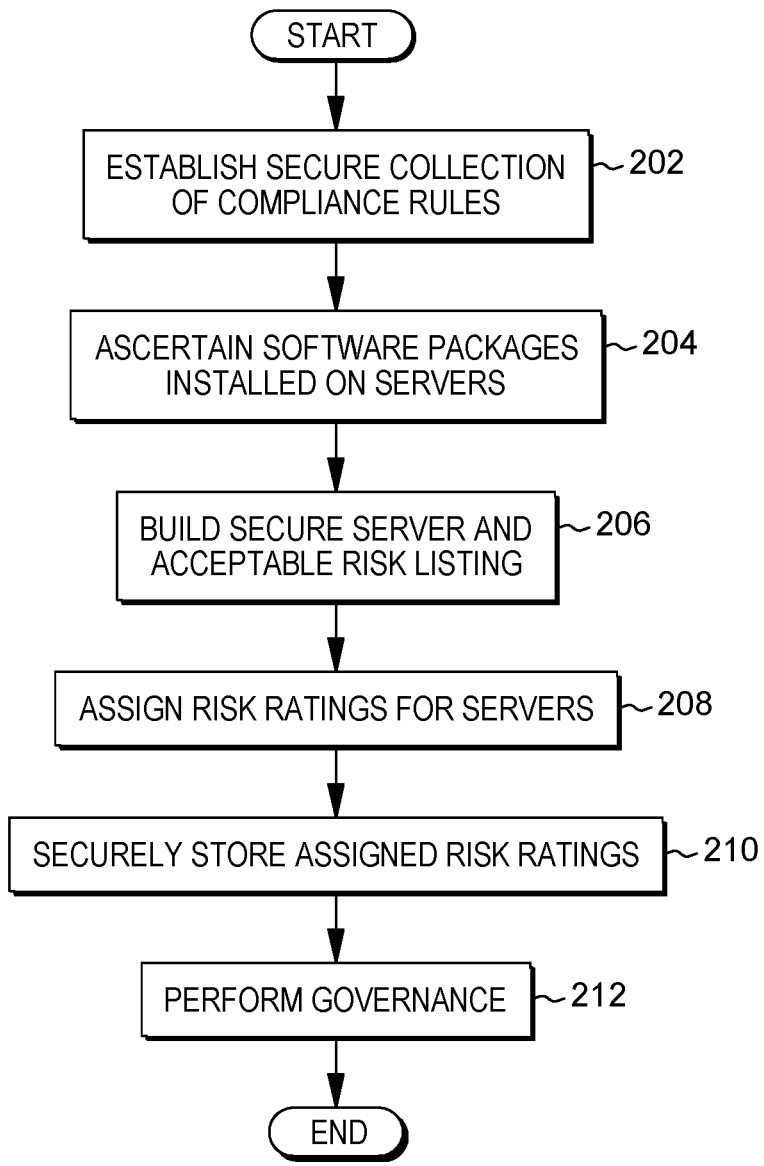
FIGS. 2A-2C depict example processes for suspending communication to/from non-compliant servers through a firewall.
Figure 2B:
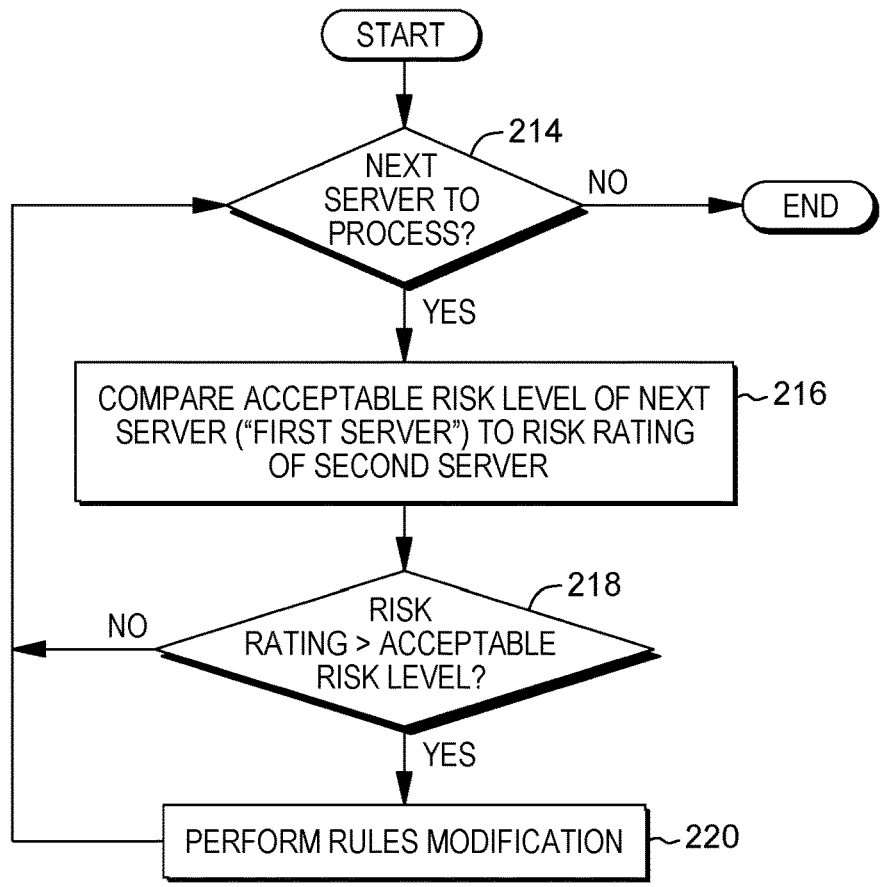
Figure 2C:
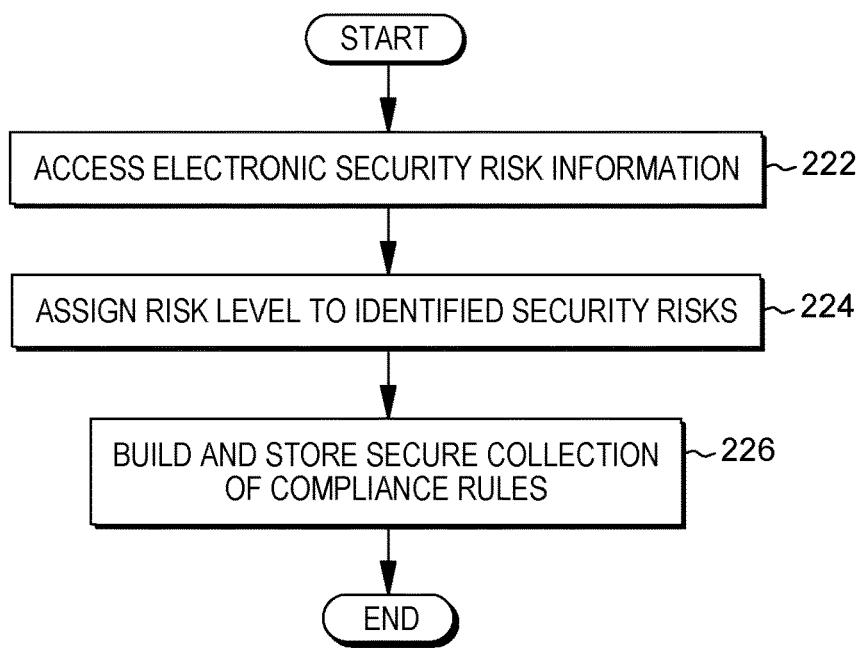

FIGS. 2A-2C depict aspects of an example process for suspending communication to/from non-compliant servers through a firewall, in accordance with aspects described herein. In some examples, the process is performed by one or more computer systems, such as those described herein, which may include one or more enterprise servers, computer systems in communication with enterprise servers, one or more cloud servers, and/or one or more other computer systems. The process of FIG. 2A begins by establishing (202) a secure collection of compliance rules for security compliance. The process ascertains (204), for each server of one or more servers of an environment, a respective one or more software packages installed on the server. In some examples, this is performed by a software audit engine. The process then builds (206) a secure server and acceptable risk listing, for instance as a distributed blockchain. The secure server and acceptable risk listing indicates each of the one or more servers of the environment and the respective one or more software packages installed on each server of the one or more servers. Based on a comparison of the compliance rules against the secure server and acceptable risk listing, the process assigns (208) risk ratings for the one or more servers.

As part of this assigning, natural language features can be extracted from accessed electronic security risk information pertaining to an identified security risk. Assigning a risk level to the identified security risk can include applying a trained classifier model to the extracted natural language features. The applying can classify the identified security risk, and the assigned risk level can be based on that classification. In some examples, the risk level is quantified based at least in part on frequency of reports of the security risk and/or sources of those reports.

Continuing with FIG. 2A, the process securely stores (210) the assigned risk ratings. These can be stored as part of the distributed blockchain, for instance.

Based on the above, the process performs (212) governance processing, described with reference to FIG. 2B. The governance processing may be performed by a governance engine and can assess whether firewall policies should be modified to disable communication between certain servers, i.e. including at least the audited servers assigned risk ratings in FIG. 2A. Those servers may be communication with each other and/or outside servers. Risks presented by the audited servers assigned the risk ratings may not be tolerable to servers communicating with the risky servers. Thus, referring to FIG. 2B, the process determines (214) whether there is a next server to process. The next server is a "first" server that is communication with a "second" server, i.e. one of the audited servers from FIG. 2A. The next (or "first") server may be another of the audited servers assigned risk ratings from FIG. 2A or may be a server not included in the group.

In any case, if there is a next server to process (214, Y), then the process of FIG. 2B compares (216), for that next ("first") server, the assigned risk rating for the second server to an acceptable risk level indicated for the first server. The acceptable risk level is a level of risk that the first server is configured to accept in communicating with the second server through a firewall. A determination (218) is made as to whether the assigned risk rating for the second server exceeds the acceptable risk level. If so (218, Y), then the process proceeds by performing (220) a rules modification to the firewall to enforce the compliance rules, the rules modification disabling communication between the first server and the second server through the firewall. In some examples, the rules modification includes suspending one or more firewall rules of the firewall. If later on a change is made to the assigned risk rating for the second server (for instance the software package on the second server is removed or patched such that the second server's risk rating decreases to below the acceptable level/threshold for the first server), then the one or more firewall rules can be reinstated.

The rules modification (220) can disable communication, between the first server and the second sever, that is associated with the software package, installed on the second server, for which an identified security risk is identified. In these cases, other communication, between the first server and the second server, not associated with the software package might remain enabled.

If instead it is determined that the assigned risk rating for the second server does not exceed the acceptable risk level (218, N), then the process returns to 214 to process a next server, if it exists. This processing of FIG. 2B iterates while there is at least one next server to process, and ends when there are no other servers to process.

FIG. 2C presents an example process for establishing the secure collection of compliance rules (202). The process is performed by a cognitive engine in some examples.

The process of FIG. 2C accesses (222) electronic security risk information, for instance blogs, product vendor literature, security articles, etc. identifying and describing security risks of software packages. The process assigns (224) a respective risk level to each of the identified security risks. Then the process builds and stores (226) the secure collection of compliance rules. At least some of the compliance rules can indicate the software packages and the assigned risk levels of the identified security risks for those packages.

In some examples, this is stored as a generated rules and risk level blockchain. In addition, some of the compliance rules can include enterprise standards for the environment set by an enterprise in control of the environment. An example standard is a password complexity requirement. Thus, in comparing the compliance rules against each of the audited servers, not only the risks posed by software but also any risks posed by non-compliance with enterprise standards can factor into the assigned risk rating of the server.

Although various examples are provided, variations are possible without departing from a spirit of the claimed aspects.

Figure 3:
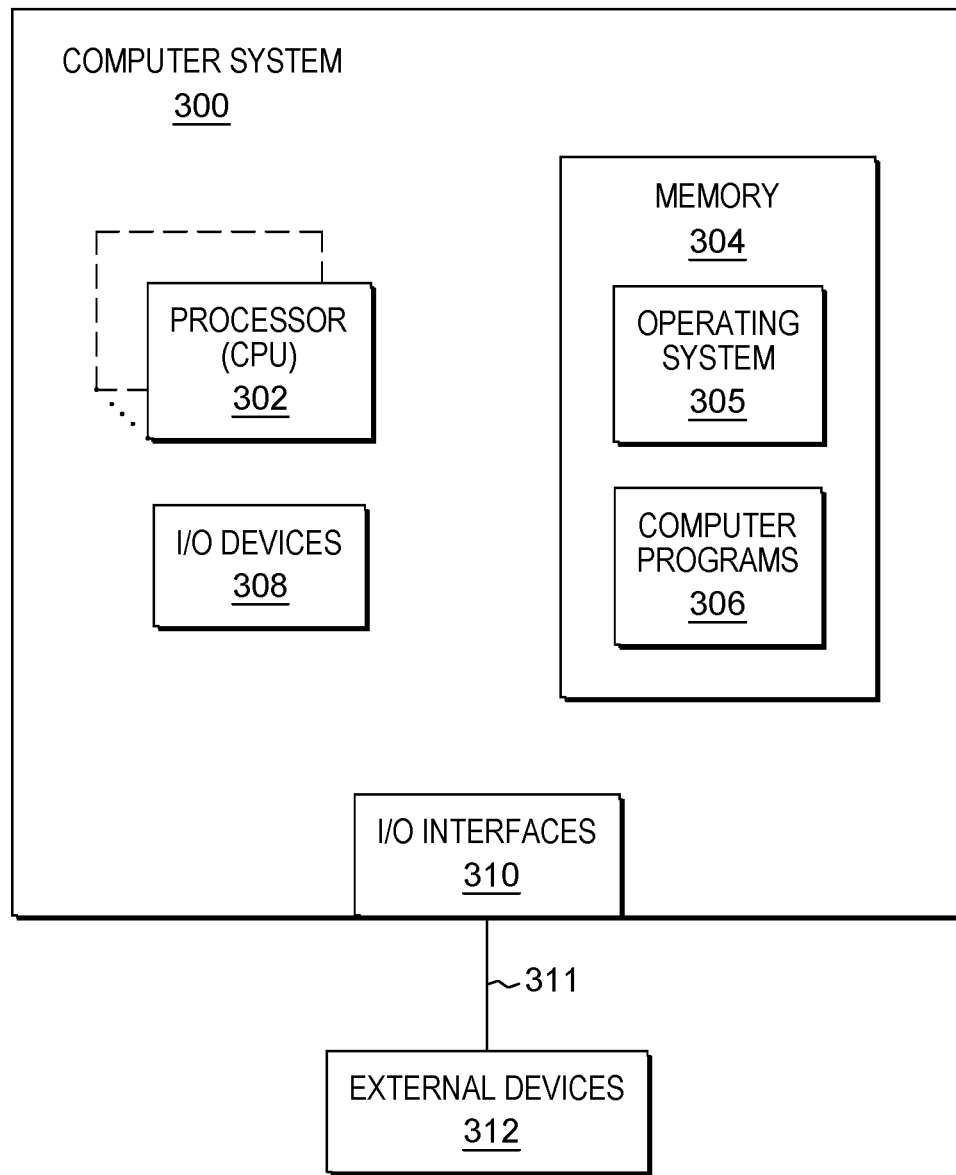
FIG. 3 depicts one example of a computer system and associated devices to incorporate and/or use aspects described herein.

Processes described herein may be performed singly or collectively by one or more computer systems. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
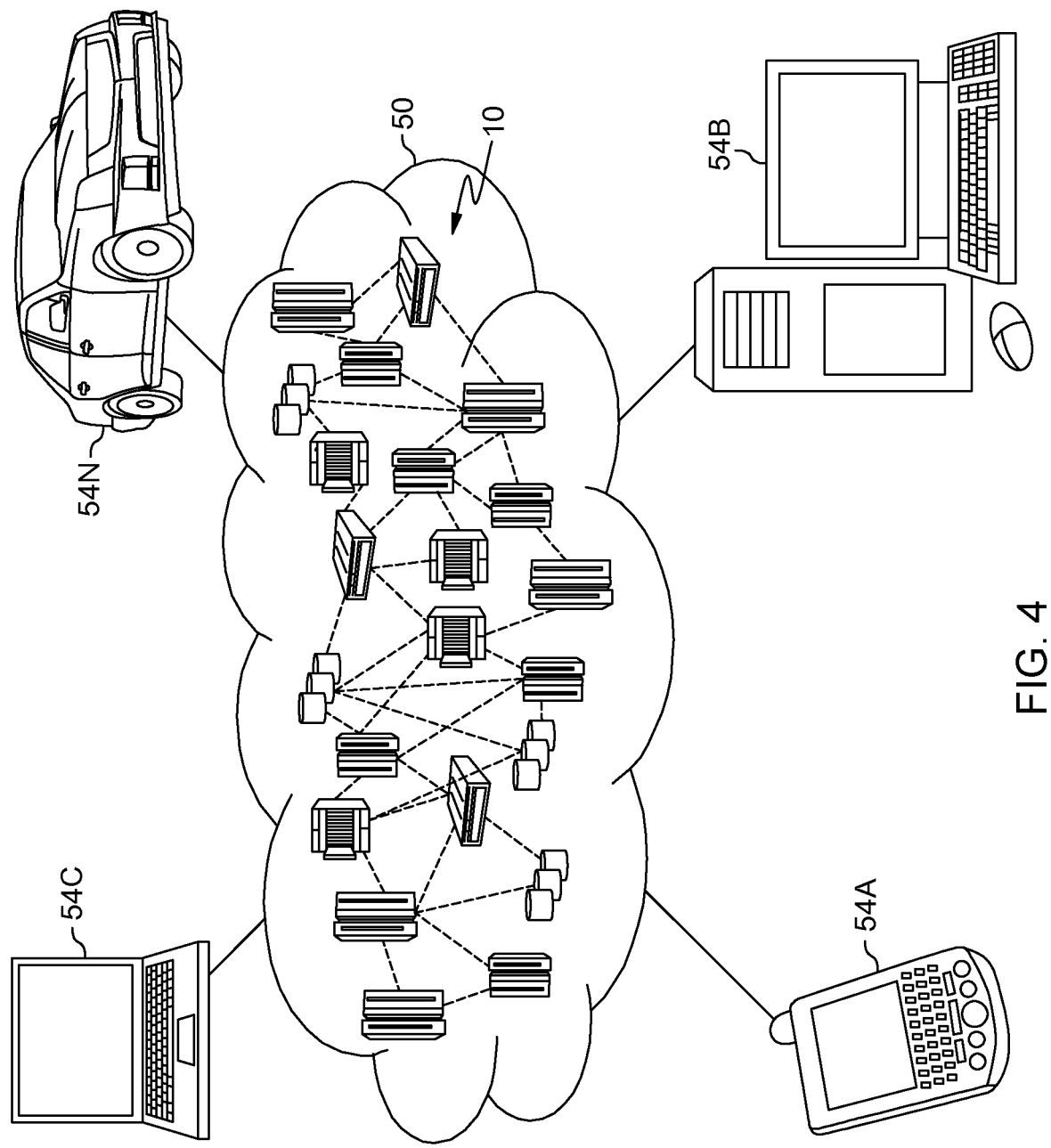
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
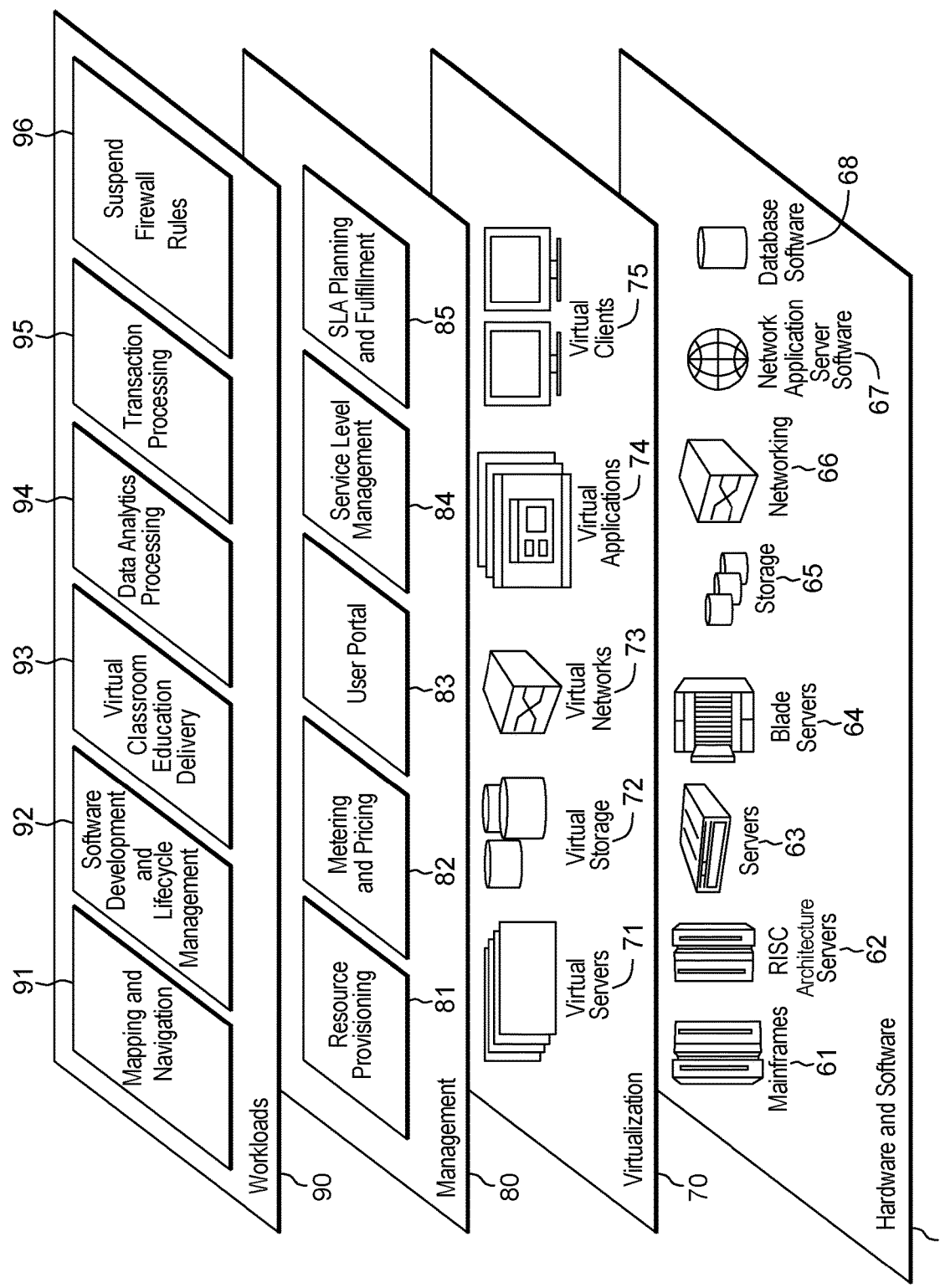
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and suspending firewall rules 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   establishing a secure collection of compliance rules for security compliance, the establishing comprising:
      accessing electronic security risk information identifying and describing security risks of software packages;
      assigning a respective risk level to each of the identified security risks; and
      building and storing the secure collection of compliance rules, including at least one new compliance rule, wherein at least some of the compliance rules indicate the software packages and assigned risk levels of the identified security risks;
   ascertaining, for each server of one or more servers of a computing environment, a respective one or more software packages installed on the server;
   building a secure server and acceptable risk listing, the secure server and acceptable risk listing indicating each of the one or more servers of the environment and the respective one or more software packages installed on each server of the one or more servers;
   assigning, based on a comparison of the compliance rules against the secure server and acceptable risk listing, risk ratings for the one or more servers;
   securely storing the assigned risk ratings;
   comparing, for a first server in communication with a second server, the second server being a server of the one or more servers, the assigned risk rating for the second server to an acceptable risk level indicated for the first server, the acceptable risk level being a level of risk the first server is configured to accept in communicating with the second server through a firewall; and
   based on determining that the assigned risk rating for the second server exceeds the acceptable risk level, performing a rules modification to the firewall to enforce the compliance rules, the rules modification disabling communication between the first server and the second server through the firewall.

2. The method of claim 1, wherein the secure server and acceptable risk listing comprises a distributed blockchain.

3. The method of claim 2, wherein the assigned risk ratings are stored as part of the distributed blockchain.

4. The method of claim 1, wherein the rules modification comprises suspending one or more firewall rules of the firewall.

5. The method of claim 4, further comprising reinstating the one or more firewall rules based on a change to the assigned risk rating for the second server.

6. The method of claim 1, wherein the assigning a risk level to an identified security risk comprises applying a trained classifier model to extracted natural language features from the accessed electronic security risk information, the applying classifying the identified security risk and assigning the risk level based on the classification.

7. The method of claim 6, wherein the risk level is quantified based at least in part on frequency of reports of the security risk and sources of those reports.

8. The method of claim 1, wherein the accessed electronic security risk information comprises security risk information from product vendor websites and security-related weblogs.

9. The method of claim 1, wherein one or more of the compliance rules of the secure collection of compliance rules includes enterprise standards for the environment set by an enterprise in control of the environment, and wherein an assigned risk rating of a server of the one or more servers is further based on whether the server is in compliance with the enterprise standards for the environment.

10. The method of claim 1, wherein the rules modification disables communication, between the first server and the second sever, that is associated with a software package, installed on the second server, for which an identified security risk is identified, wherein other communication, between the first server and the second server, not associated with the software package remains enabled.

11. A computer system comprising:
a memory; and
a processor in communication with the memory, wherein the computer system is configured to perform a method comprising:
establishing a secure collection of compliance rules for security compliance, the establishing comprising:
accessing electronic security risk information identifying and describing security risks of software packages;
assigning a respective risk level to each of the identified security risks; and
building and storing the secure collection of compliance rules, including at least one new compliance rule, wherein at least some of the compliance rules indicate the software packages and assigned risk levels of the identified security risks;
ascertaining, for each server of one or more servers of a computing environment, a respective one or more software packages installed on the server;
building a secure server and acceptable risk listing, the secure server and acceptable risk listing indicating each of the one or more servers of the environment and the respective one or more software packages installed on each server of the one or more servers;
assigning, based on a comparison of the compliance rules against the secure server and acceptable risk listing, risk ratings for the one or more servers;
securely storing the assigned risk ratings;
comparing, for a first server in communication with a second server, the second server being a server of the one or more servers, the assigned risk rating for the second server to an acceptable risk level indicated for the first server, the acceptable risk level being a level of risk the first server is configured to accept in communicating with the second server through a firewall; and
based on determining that the assigned risk rating for the second server exceeds the acceptable risk level, performing a rules modification to the firewall to enforce the compliance rules, the rules modification disabling communication between the first server and the second server through the firewall.

12. The computer system of claim 11, wherein the secure server and acceptable risk listing comprises a distributed blockchain.

13. The computer system of claim 11, wherein the rules modification comprises suspending one or more firewall rules of the firewall.

14. The computer system of claim 11, wherein the assigning a risk level to an identified security risk comprises applying a trained classifier model to extracted natural language features from the accessed electronic security risk information, the applying classifying the identified security risk and assigning the risk level based on the classification.

15. The computer system of claim 11, wherein one or more of the compliance rules of the secure collection of compliance rules includes enterprise standards for the environment set by an enterprise in control of the environment, and wherein an assigned risk rating of a server of the one or more servers is further based on whether the server is in compliance with the enterprise standards for the environment.

16. The computer system of claim 11, wherein the rules modification disables communication, between the first server and the second sever, that is associated with a software package, installed on the second server, for which an identified security risk is identified, wherein other communication, between the first server and the second server, not associated with the software package remains enabled.

17. A computer program product comprising:
a computer readable storage medium readable by a processing circuit and storing instructions for execution by the processing circuit for performing a method comprising:
establishing a secure collection of compliance rules for security compliance, the establishing comprising:
accessing electronic security risk information identifying and describing security risks of software packages;
assigning a respective risk level to each of the identified security risks; and
building and storing the secure collection of compliance rules, including at least one new compliance rule, wherein at least some of the compliance rules indicate the software packages and assigned risk levels of the identified security risks;
ascertaining, for each server of one or more servers of a computing environment, a respective one or more software packages installed on the server;
building a secure server and acceptable risk listing, the secure server and acceptable risk listing indicating each of the one or more servers of the environment and the respective one or more software packages installed on each server of the one or more servers;
assigning, based on a comparison of the compliance rules against the secure server and acceptable risk listing, risk ratings for the one or more servers;
securely storing the assigned risk ratings;

comparing, for a first server in communication with a second server, the second server being a server of the one or more servers, the assigned risk rating for the second server to an acceptable risk level indicated for the first server, the acceptable risk level being a level of risk the first server is configured to accept in communicating with the second server through a firewall; and based on determining that the assigned risk rating for the second server exceeds the acceptable risk level, performing a rules modification to the firewall to enforce the compliance rules, the rules modification disabling communication between the first server and the second server through the firewall.

18. The computer program product of claim 17, wherein the secure server and acceptable risk listing comprises a distributed blockchain.

19. The computer program product of claim 17, wherein the rules modification comprises suspending one or more firewall rules of the firewall.

20. The computer program product of claim 17, wherein the rules modification disables communication, between the first server and the second sever, that is associated with a software package, installed on the second server, for which an identified security risk is identified, wherein other communication, between the first server and the second server, not associated with the software package remains enabled.

* * * * *